(12) United States Patent
Berger et al.

(10) Patent No.: US 8,935,235 B1
(45) Date of Patent: Jan. 13, 2015

(54) SEARCH HISTORY, EMAIL CHECKING, AND BLOG POSTING WIDGETS

(75) Inventors: Jonathan Berger, Mountain View, CA (US); Mark Zavislak, Mountain View, CA (US); Peter W. Hopkins, San Jose, CA (US); Scott Bonneau, Ithaca, NY (US)

(73) Assignee: Google Inc., Mountain View, CA (US)

( * ) Notice: Subject to any disclaimer, the term of this patent is extended or adjusted under 35 U.S.C. 154(b) by 1378 days.

(21) Appl. No.: 11/677,523

(22) Filed: Feb. 21, 2007

Related U.S. Application Data (60) Provisional application No. 60/775,824, filed on Feb. 21, 2006.

(51) Int. Cl.
*G06F 17/30* (2006.01)
(52) U.S. Cl.
USPC .......................................................... 707/721
(58) Field of Classification Search
USPC ................................................ 707/721, 726
See application file for complete search history.

(56) References Cited

U.S. PATENT DOCUMENTS

| | | | | |
|---|---|---|---|---|
| 6,721,747 | B2* | 4/2004 | Lipkin | 707/10 |
| 7,082,430 | B1* | 7/2006 | Danielsen et al. | 707/10 |
| 7,596,571 | B2* | 9/2009 | Sifry | 1/1 |
| 2005/0289147 | A1* | 12/2005 | Kahn et al. | 707/10 |
| 2006/0167860 | A1* | 7/2006 | Eliashberg et al. | 707/3 |
| 2007/0100836 | A1* | 5/2007 | Eichstaedt et al. | 707/10 |

OTHER PUBLICATIONS

Apple, Inc., "DashBlog," http://www.apple.com/downloads/dashboard/blogs_forums/dashblog.html.
Tate, J., "DashBlog," Ver. 0.12 Beta, undated.

* cited by examiner

*Primary Examiner* — Huawen Peng
(74) *Attorney, Agent, or Firm* — Morgan, Lewis & Bockius LLP (57) ABSTRACT

A search history application retrieves and displays a user's remotely stored search history. The search history is sent to the application in the form of a content feed. An email checking application receives a list of new emails as a content feed and displays the list of new emails. New emails for multiple accounts may be displayed concurrently in distinct instances of the email checking application. A blog posting application allows a user to select any of a plurality of blogs under the user's account and post to that blog.

18 Claims, 11 Drawing Sheets

Username:

stanfordjonathan2

Password:

●●●●●

Post to Blog:

stanfordjonathan5

☐ Show title field

B
©2006 Google Inc. Terms of Use (Done)

Figure 11A

B stanfordjonathan5

(Save as Draft) (Publish Post)

Figure 11B

US 8,935,235 B1

SEARCH HISTORY, EMAIL CHECKING, AND BLOG POSTING WIDGETS

RELATED APPLICATIONS

This application claims priority to U.S. Provisional Patent Application No. 60/775,824, "Search History, Email Checking, and Blog Posting Widgets," filed Feb. 21, 2006, which is hereby incorporated by reference.

TECHNICAL FIELD

The disclosed embodiments relate generally to widget applications, and more particularly, to a method of providing a user's search history, stored remotely, to a widget application via a content feed; to a method of displaying email messages from multiple accounts concurrently in instances of a widget application; to a method of posting content to any of a plurality of blogs associated with a user via a widget, and to a method of authenticating a user without using cookies.

BACKGROUND

Modern computers allow users to perform many tasks and can provide much information to users. Often, there are a particular set of tasks the user performs much more than other tasks or particular information that the user wishes to review more than others. Thus, to boost user productivity, increasing the efficiency in the performance of these tasks or in the acquisition of such information makes good sense.

However, in current applications, the performance of these frequent tasks or the acquisition of the desired information often takes many steps. The steps can vary from waiting for applications to load to going through a complex menu and options structure. These steps slow down the user's efficiency in performing the tasks or acquiring the information. Accordingly, there is a need for more efficient applications for performing such tasks or acquiring such information.

BRIEF DESCRIPTION OF THE DRAWINGS

Like reference numerals refer to corresponding parts throughout the drawings.

DESCRIPTION OF EMBODIMENTS

Figure 1:
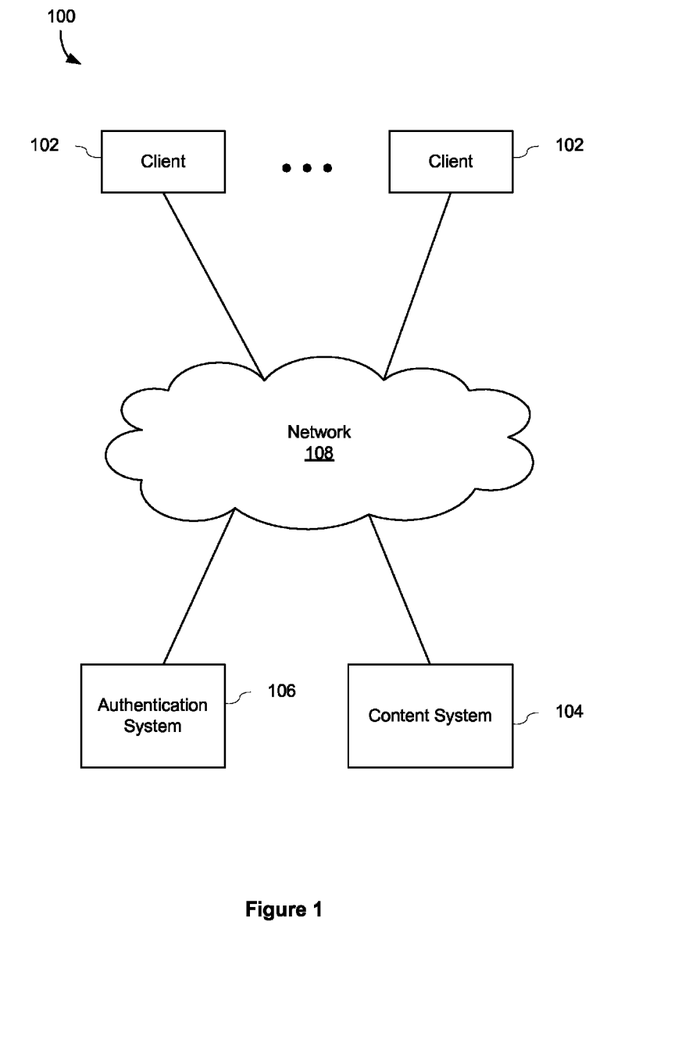
FIG. 1 is a block diagram illustrating a computer network, in accordance with some embodiments.

FIG. 1 is a block diagram illustrating a computer network, in accordance with some embodiments. The computer network 100 includes one or more clients 102, a content system 104, an authentication system 106, and a network 108. The network 106 may include, without limitation, local-area networks (LAN), wide-area networks (WAN), wireless networks, the Internet, or any combination of such networks.

The clients 102 are devices from which a user may access content or submit content to other computers. The client may be any device capable of communicating with other computers, devices, and so forth through the network 108. Examples of client devices may include, without limitation, desktop computers, notebook (or laptop) computers, personal digital assistants (PDAs), mobile telephones (sometimes called cell phones), network terminals, and so forth. In some embodiments, the client includes one or more applications for communicating with other computers or devices through the network 106. Examples of such applications include, without limitation, web browsers, email applications, and instant messaging or chat applications.

In some embodiments, the applications are what is known in the art as "widgets." Widgets are small, specialized applications that perform specific tasks, and may be created using a markup language (e.g., Hypertext Markup Language and Extensible Markup Language), a scripting language (e.g., JavaScript), and optionally Cascading Style Sheets (CSS). In some embodiments, a runtime engine known as a widget engine is the platform on which the widgets are executed by a client 102. Examples of widget engines include Dashboard by Apple Computer and Yahoo! Widgets by Yahoo!.

The content system 104 stores and provides content to clients 102. The content system 104 may include one or more computers, such as content server 600, further details of which are described below. The content system 104 may store a variety of content, including but not limited to, emails and weblog postings. For example, the content system 104 may provide an email service, where users may send and receive emails, and a weblog service, where users may post content to weblogs (also known as blogs). In some embodiments, the content system 104 may include a search engine. The search engine may monitor users' search engine activity, namely searches performed and links selected from search results, and may store log records (also called logs) that record information about the users' search engine activity such as the search histories of various users.

Content, such as emails, blogs, and search histories, may be associated with particular users and stored on a per-user level. That is, users of the content system 104 may have user accounts in the content system 104 and content associated with the users is stored in the content system 104 and associated with the users' respective accounts.

An authentication system 106 provides authentication services for the content system 104. That is, the authentication system authenticates users for access to content or services provided by the content system 104. In some embodiments, the authentication system 106 may include one or more servers for providing such authentication services. Furthermore, in some embodiments, the authentication system may be integrated with the content system 104. Further details regarding the authentication process is described below.

Figure 2:
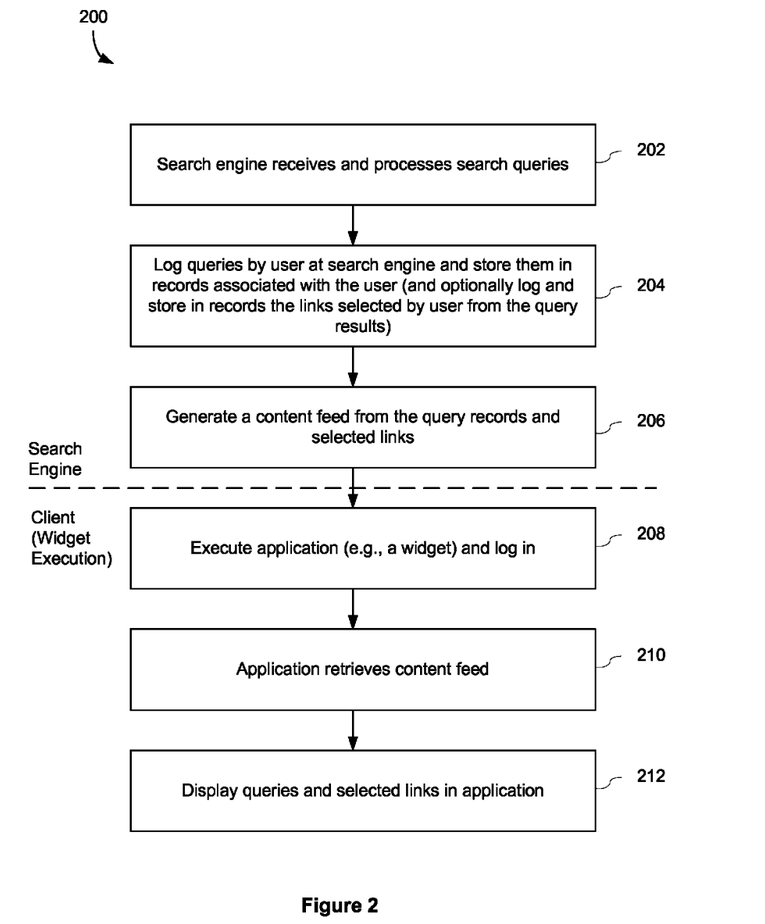
FIG. 2 is a flow diagram illustrating a process for providing remotely stored search history via a content feed, in accordance with some embodiments.

FIG. 2 is a flow diagram illustrating a process 200 for providing remotely stored search history via a content feed, in accordance with some embodiments. A search engine may store a user's search history. The search engine may provide the search history to an application, such as a widget.

A first part of the process 200 is performed at a search engine. The search engine receives and processes search queries submitted by a user (202). The user may access the search engine via a web browser at a client 102. In some embodiments, in order for the search engine to know who is conducting the searches and with whose account to associate the searches, the search engine may require the user to log in, if the user wishes to have his search history saved. Thus, in these embodiments the search engine receives a username and password from the client being used by the user. In some other embodiments, the search engine receives a cookie from the client, where the cookie includes a user identifier or other information that enables the search engine to identify the user.

The searches conducted by the user are logged by the search engine (204). The search engine logs the search queries, which includes terms (words and phrases) and operators (such as AND, OR, exact phrase, etc.) in the searches conducted by the user. Optionally, additional search options such as limitations on domains to search or type of content to search may be logged as well. In some embodiments, the search engine also logs the links in the search results that are selected by the user. However, logging of the selected links is optional. The search queries, and optionally the links selected from the search results, form the user's search history.

In some embodiments, the user may control which searches are logged by the search engine and which are not. For example, the user may stop the recording of his searches by logging out or closing the web browser, terminating the session. In some embodiments, the search engine may also allow the user to toggle an option to disable logging of the search history. The search history is stored at a computer, such as a server, remote from the client from which the user conducted the searches, and associated with the user's account. The search engine may retain just the search history from the most recent number of days (e.g., the last 60 days), or may retain the search history indefinitely.

The search engine generates a content feed from the search history (206). The content feed is generated in accordance with well known content feed formats such as Really Simple Syndication (RSS) and Atom. In some embodiments, the content feed may include the entire search history. In some other embodiments, the content feed may include only the search history from a predefined number of days to the present (e.g., the last 30 days).

A second part of the process 200 is performed at a client. The client 102 executes a search history application (208). This client may be the same as or different from the client at which the user conducted his searches. In some embodiments, the application is a widget that is configured to retrieve the user's search history content feed. In some embodiments, the application receives login information from the user, which is then used to identifying the user to the search engine. Alternately, a cookie or other mechanism is used to provide user identifying information to the search engine. The application retrieves the search history content feed associated with the user (210). The contents of the content feed, namely the searches and selected links, are displayed in the application (212).

Figure 3:
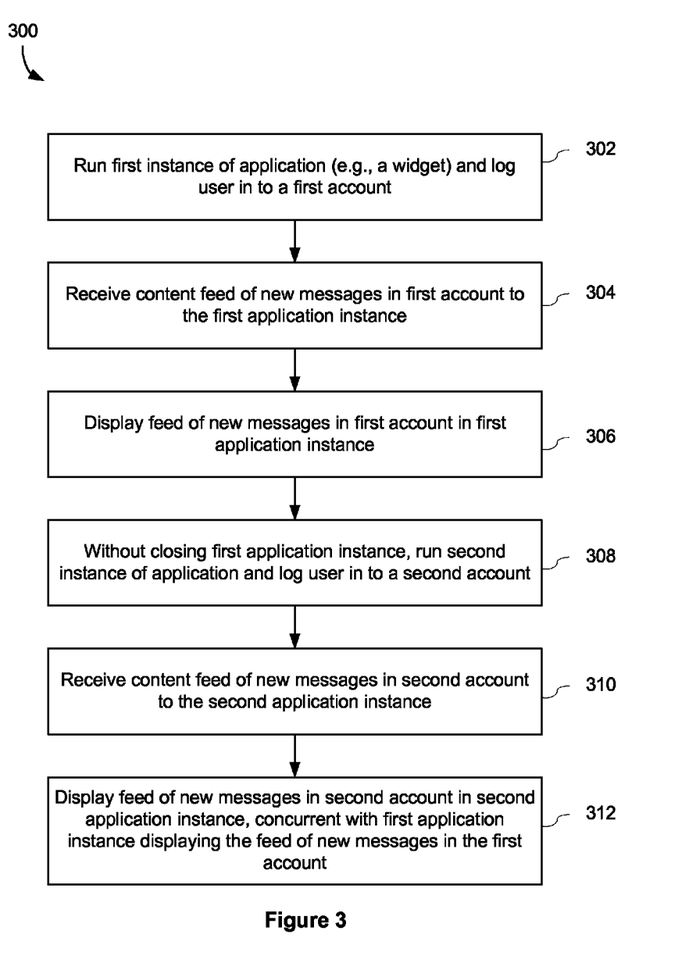
FIG. 3 is a flow diagram illustrating a process for displaying email messages from multiple accounts concurrently, in accordance with some embodiments.

FIG. 3 is a flow diagram illustrating a process for displaying email messages from multiple accounts concurrently, in accordance with some embodiments. An application, such as a widget, can check a user's email account for new email messages and show information regarding such messages. Multiple instances of the application may show information regarding new messages in multiple accounts in the same email service. In one embodiment, each instance of the application enables a user to access his inbox or an individual email message.

A first instance of an application configured to check for email messages is executed at a client. The user and the first application instance are authenticated for access to a first email account (302). The authentication process includes the user providing the correct username and password for the first email account. Alternately, the user may have previously provided the username and password for the first email account to the application. In either case, the first application instance logs the user in to the first email account. After authentication is complete, the first application instance downloads a content feed containing information associated with the first email account (304). For example, the content feed may include information regarding new or unread emails in the first email account. The content feed, which includes information regarding new or unread email messages in the account, is generated by the content system. In some embodiments, the content feed is generated by the content system as new email messages for the first email account are received. Information in the content feed is displayed in the first application instance (306). In some embodiments, the information that is displayed may be limited to information associated with new or unread emails in particular folders or having particular labels. The information that is displayed includes the sender, subject, and date of the email messages. In some embodiments, snippets of the bodies of the email messages may be displayed as well.

Without closing the first application instance, a second instance of the application is executed by the client (308). The user and the second application instance are authenticated for access to a second email account, which is an account that may be different from the first email account. The authentication process includes the user providing the correct username and password for the second email account. Alternately, the user may have previously provided the username and password for the second email account to the application. In either case, the second application instance logs the user in to the second email account. After authentication is complete, the second application instance downloads a content feed containing information associated with the second email account (310). The content feed includes information regarding new or unread emails in the second email account. For example, the content feed, may include information regarding new or unread email messages in the account, is generated by the content system. In some embodiments, the content feed is generated by the content system as new email messages for the second email account are received. Information in the content feed is displayed in the second application instance (312). In some embodiments, the information that is displayed may be limited to information associated with new or unread emails in particular folders or having particular labels. The information that is displayed includes the sender, subject, and date of the email messages. In some embodiments, snippets of the bodies of the email messages may be displayed as well.

Thus, a user can run multiple instances of an email checking application concurrently, with each instance checking different email accounts and showing information regarding new email messages for the respective accounts.

Figure 4:
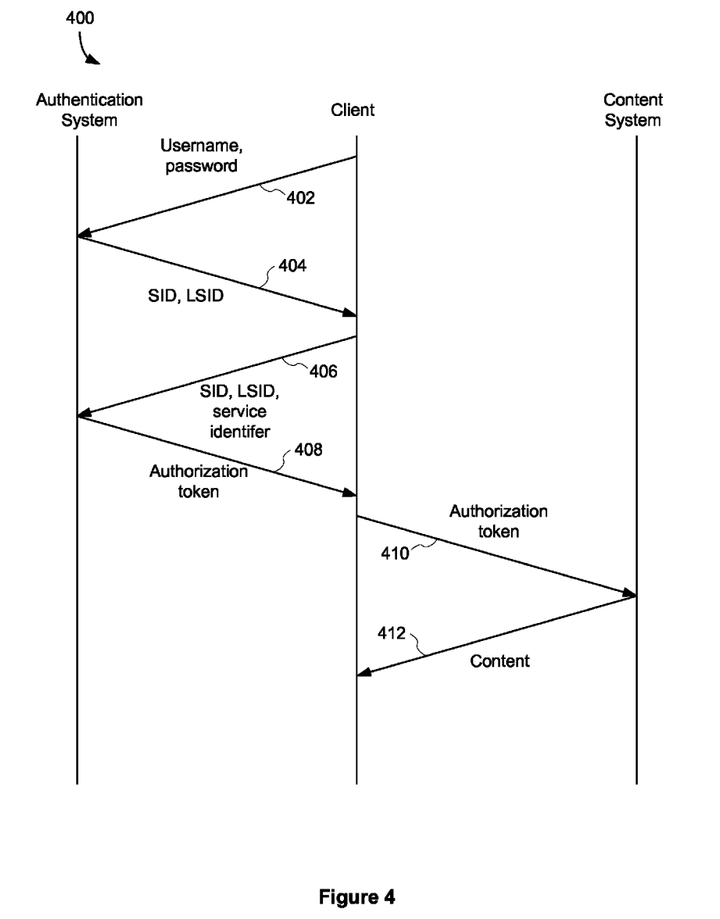
FIG. 4 is a diagram of a process for authenticating a user without using cookies, in accordance with some embodiments.

FIG. 4 is a diagram of a process for authenticating a user without using cookies, in accordance with some embodiments. As described above, an instance of an email checking application is authenticated to access a user's email account. A common method of authentication involves the application instance and the authentication system exchanging cookies and storing the cookies at the client in a cookie repository associated with the application. However, multiple instances of the same email checking application may share the same cookie repository, and if the multiple instances are attempting to access different email accounts in the same domain, the cookies from the multiple instances may overwrite each other, causing access problems. Process flow 400 illustrates an authentication process that avoids this problem and that does not require the use of cookies. For ease of understanding, process flow 400 will be described below in the context of the email checking application described in FIG. 3 above. However, it should be appreciated that any application requiring user login to an account may use this authentication process.

The client sends a username and password to the authentication system (402). A user at the client runs the email checking application and types in a username (or account name) and password for the email account he wishes to access. The username and password are sent by the client to the authentication system. The authentication system verifies that the username (i.e., the account) exists and that the password for the username is correct. If either is wrong, the authentication process fails. If both are proper, then the authentication system sends one or more identification values to the client (404). The client then sends to the authentication system the same identification values and a designation or identifier of the service or application for which authentication is desired (406). In the context of an email checking application, the service or application is email (or whatever name is given to the particular email service for which authentication is desired). The authentication system sends back an authorization token to the client (408). The client sends the authorization token to the content system (410). The content system processes the authorization token, determines, based on the authorization token, that the client is authorized to access the email account, and sends the client the desired content, which in this case is a content feed of new email messages (412).

Figure 5:
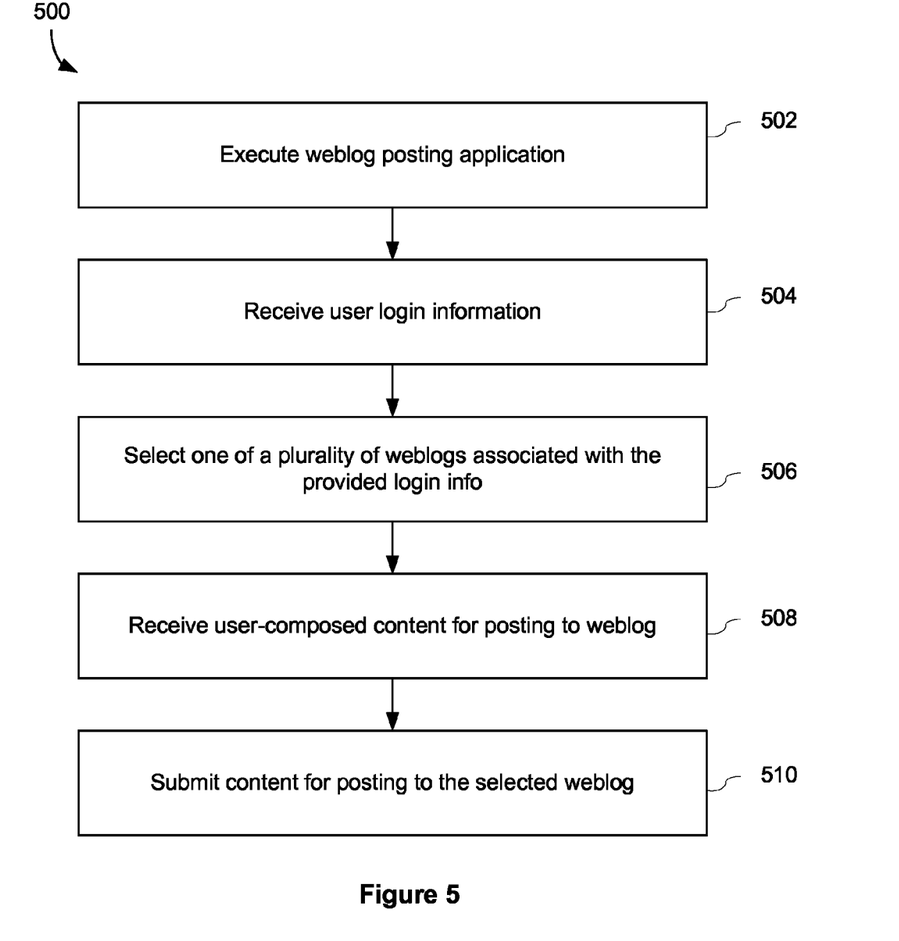
FIG. 5 is a flow diagram illustrating a process for posting to one of a plurality of blogs associated under one account, in accordance with some embodiments.

FIG. 5 is a flow diagram illustrating a computer implemented process for posting content to one of a plurality of blogs associated under one account, in accordance with some embodiments. A weblog posting application is executed by the client (502). The weblog posting application receives login information from the user, which the user provides in order to log into his weblog account (504). The user's weblog account may be associated with a plurality of weblogs. The application receives a user command that selects one of those weblogs under the account (506). The application also received user-composed content to be posted to the selected weblog (508). The content is then submitted by the weblog posting application for posting to the weblog (510). In some embodiments, the content is posted to a content feed (such as an RSS or Atom feed) associated with the selected weblog. In some embodiments, the weblog posting application may save the content as a draft (e.g., by selecting a "Save as Draft" option in the user interface, as shown in FIG. 11B), enabling the user to return to it later for further editing and submission. For example, the draft content may be saved in a respective weblog as a draft, so that it is not published for viewing by other users. The content is published for viewing only after the user posts the content to the weblog (e.g., by selecting a "Publish Post" option in the user interface, as shown in FIG. 11B).

Figure 6:
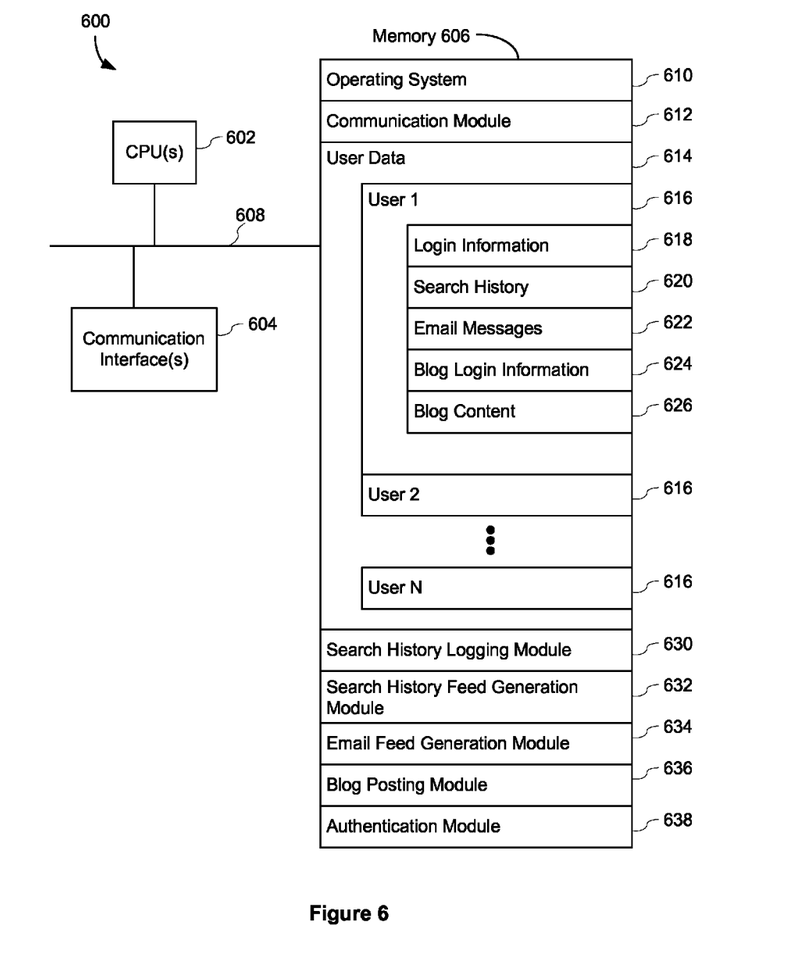
FIG. 6 is a block diagram illustrating a content server, in accordance with some embodiments.

FIG. 6 is a block diagram illustrating a content server, in accordance with some embodiments. The content server 600 typically includes one or more processing units (CPU's) 602, one or more network or other communications interfaces 604, memory 606, and one or more communication buses 608 for interconnecting these components. The communication buses 608 may include circuitry (sometimes called a chipset) that interconnects and controls communications between system components. The content server 600 optionally may include a user interface comprising a display device and a keyboard and/or a mouse (not shown). Memory 606 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 610 that includes procedures for handling various basic system services and for performing hardware dependent tasks;
- a network communication module 612 that is used for connecting the content server 600 to other computers via the one or more communication network interfaces 604 (wired or wireless) and one or more communication networks, such as the Internet, other wide area networks, local area networks, metropolitan area networks, or any suitable combination of such networks;
- user data 614 for storing per-user data;
- search history logging module 630 for logging users' search histories;
- search history feed generation module 632 for generating content feeds from users' search histories and providing the same;
- email feed generation module 634 for generating content feeds from users' email messages and providing the same;
- blog posting module 636 for posting user-submitted content to their respective blogs; and
- authentication module 638 for authenticating users.

The user data 614 may include data 616 for a plurality of users. The data 616 for a particular user may include the following, or a subset or a superset thereof:

- login information 618, for storing information, such as username and password, for logging into the user's account; alternately, the login information 618 may be information (e.g., the username and a hash value or encrypted value corresponding to the password) for verifying a user's username and password without storing the actual text of the user's password;
- search history 620, for storing the user's search history;
- email messages 622, for storing the user's email messages;
- blog login information 624, information, such as username and password, for logging into one or more blogs under the user's account; and
- blog content 626, for storing content in the user's blogs.

In some embodiments, blog content 626 includes data identifying all the blogs associated with a respective user or a respective set of login information as well as the content of those blogs.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 may store additional modules and data structures not described above.

Although FIG. 6 shows a "content server," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a content server and how features are allocated among them will vary from one implementation to another, and may depend in part on the amount of data traffic that the system must handle during peak usage periods as well as during average usage periods.

Figure 7:
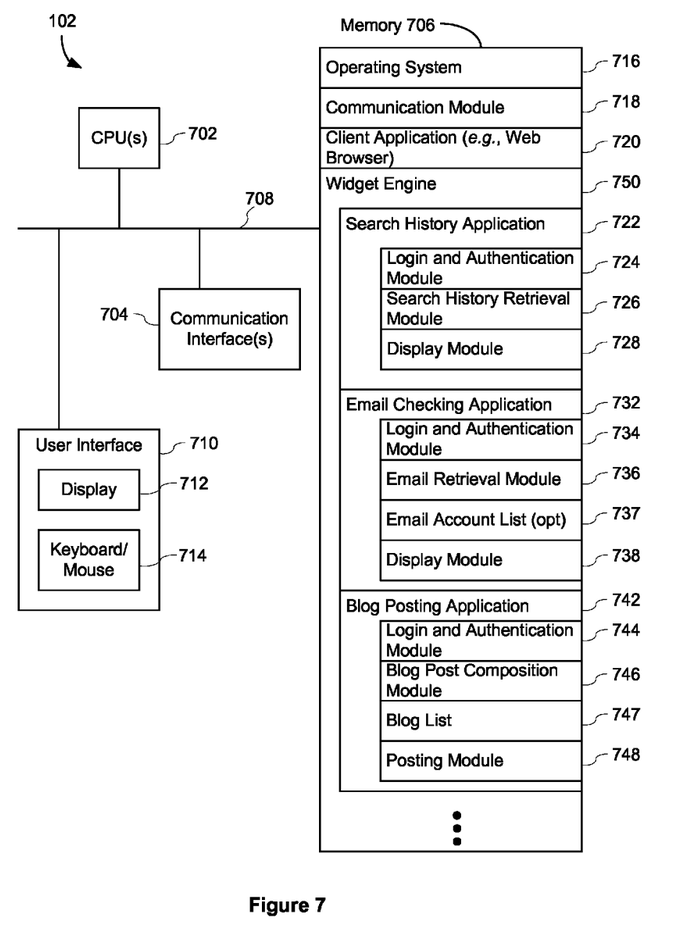
FIG. 7 is a block diagram illustrating a client, in accordance with some embodiments.

FIG. 7 is a block diagram illustrating a client 102, in accordance with some embodiments. The client 102 typically includes one or more processing units (CPU's) 702, one or more network or other communications interfaces 704, memory 706, and one or more communication buses 708 for interconnecting these components. The communication buses 708 may include circuitry (sometimes called a chipset) that interconnects and controls communications between system components. The client 102 also includes a user interface 710 comprising a display device 712 and a keyboard and/or a mouse 714. Memory 706 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules and data structures, or a subset thereof:

- an operating system 716 that includes procedures for handling various basic system services and for performing hardware dependent tasks;
- a network communication module 718 that is used for connecting the client 102 to other computers via the one or more communication network interfaces 704 (wired or wireless) and one or more communication networks, such as the Internet, other wide area networks, local area networks, metropolitan area networks, or any suitable combination of such networks;
- a client application 720, such as a web browser; and
- a widget engine 750.

The widget engine 750 (an example of which is Dashboard by Apple Computer) may run one or more applications known as widgets. These widgets are also stored in memory 706 and may include one or more of the following:

- a search history application 722, for receiving and displaying remotely stored user search history;
- an email checking application 732, for checking email; and
- a blog posting application 742 for posting content to weblogs.

The search history application 722 includes a login and authentication module 724 for authenticating users, search history retrieval module 726 for downloading search history content feeds; and display module 728 for displaying the information contained in the search history content feeds to the user (or for formatting the information for display by the widget engine 750).

The email checking application 732 includes a login and authentication module 734 for authenticating users, email retrieval module 736 for downloading content feeds of new emails; a list 737 of email accounts associated with a user of the client 102; and display module 738 for displaying the information contained in the new email content feeds to the user (or for formatting the information for display by the widget engine 750). The list of email accounts 737 is optional, and may optionally include username and password information for each of a plurality of email accounts associated with the user.

The blog posting application 742 includes a login and authentication module 744 for authenticating users, blog post composition module 746 for providing users tools for composing blog posts, a list 747 of blogs (weblogs) associated with a respective user of the client 102; and posting module 748 for posting user-composed content to a blog of the user's choosing. In some embodiments, the list 747 of weblogs is automatically downloaded from a server that hosts the weblogs associated with the user. Optionally, the list 474 of weblogs includes the login information required to post content to the listed weblogs.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. For example, a respective login and authentication module 724, 734, 744, or a respective display module 728, 738, 748 may be shared by two or more applications. In some embodiments, memory 706 may store a subset of the modules and data structures identified above. Furthermore, memory 706 may store additional modules and data structures not described above.

Figure 8:
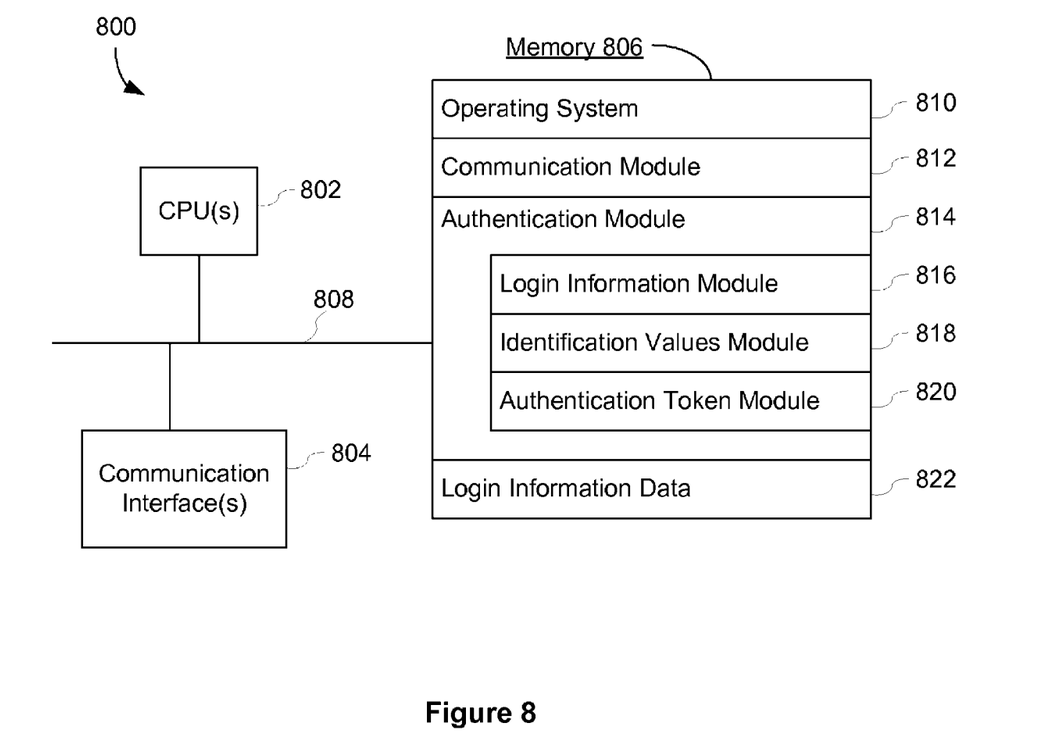
FIG. 8 is a block diagram illustrating an authentication server, in accordance with some embodiments.

FIG. 8 is a block diagram illustrating an authentication server, in accordance with some embodiments. The authentication server 800 typically includes one or more processing units (CPU's) 802, one or more network or other communications interfaces 804, memory 806, and one or more communication buses 808 for interconnecting these components. The communication buses 808 may include circuitry (sometimes called a chipset) that interconnects and controls communications between system components. The authentication server 800 optionally may include a user interface comprising a display device and a keyboard and/or a mouse (not shown). Memory 806 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPU(s) 802. In some embodiments, memory 806 stores the following programs, modules and data structures, or a subset thereof:

- an operating system 810 that includes procedures for handling various basic system services and for performing hardware dependent tasks;

a network communication module 812 that is used for connecting the authentication server 800 to other computers via the one or more communication network interfaces 804 (wired or wireless) and one or more communication networks, such as the Internet, other wide area networks, local area networks, metropolitan area networks, or any suitable combination of such networks;

an authentication module 814 for authenticating users; and login information data 822, for storing users' usernames and passwords, or information sufficient to authenticate users' usernames and passwords.

The authentication module 814 includes a login information module 816, for receiving and checking usernames and passwords provided by users (e.g., sent by clients in conjunction with login requests), identification values module 818 for generating identification values during the authentication process, and authentication token module 820 for generating authentication tokens.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 806 may store a subset of the modules and data structures identified above. Furthermore, memory 806 may store additional modules and data structures not described above.

Although FIG. 8 shows an "authentication server," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement an authentication server and how features are allocated among them will vary from one implementation to another, and may depend in part on the amount of data traffic that the system must handle during peak usage periods as well as during average usage periods.

Figure 9A:
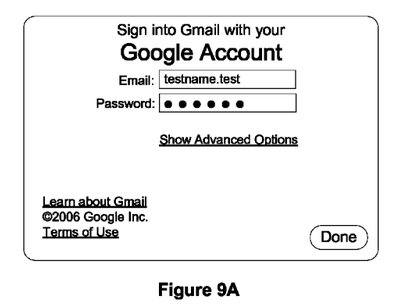
FIGS. 9A-9C are schematic diagrams of a user interface of an email checking application, in accordance with some embodiments.
Figure 9B:
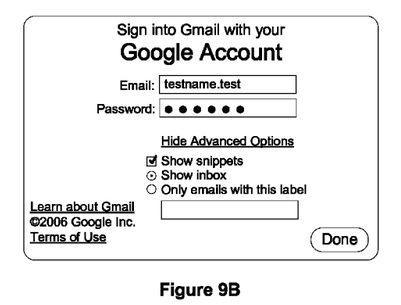
Figure 9C:
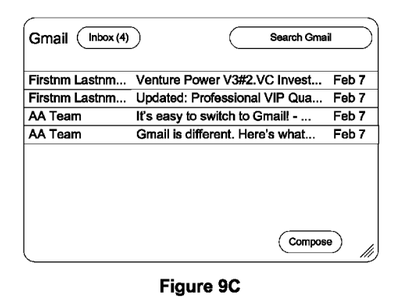

FIGS. 9A-9C are examples of a user interface of an email checking application (e.g., email checking application 732, FIG. 7), in accordance with some embodiments. FIG. 9A shows the login interface for an email checking application. The interface includes text boxes for typing in a username and a password. FIG. 9B shows the login interface with additional options. The additional options include a checkbox for choosing whether to show snippets of email messages (e.g., unread email messages, or new email messages not previously shown to the user) and a selection of whether to show new or unread email messages in the inbox, or new or unread email messages having a particular label (or alternatively, new or unread email messages in a particular folder).

After the user submits the username and password and is authenticated, the application displays the new or unread email messages, as shown in FIG. 9C. The application displays the sender, subject, and date of the email messages. The application may also show snippets of the messages, if the user had activated that option. The user may click on a message to go to the full message, and the user may search for words and phrases in the messages.

Figure 10A:
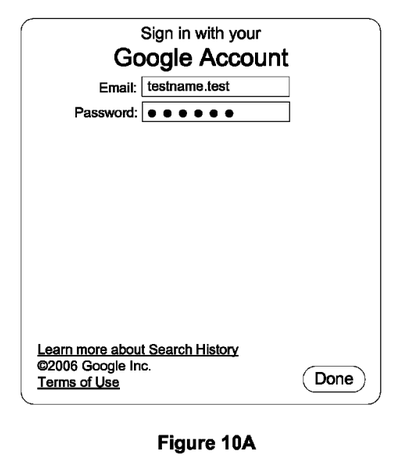
FIGS. 10A-10B are schematic diagrams of a user interface of a search history application, in accordance with some embodiments.
Figure 10B:
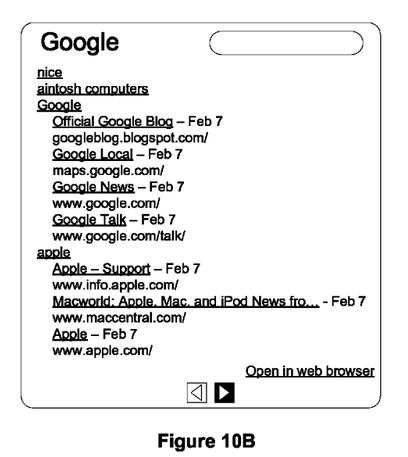

FIGS. 10A-10B are examples of a user interface of a search history application (e.g., search history application 722, FIG. 7), in accordance with some embodiments. FIG. 10A shows the login interface, where the user provides a username and password for logging in. After the user logs in, the application displays the user's search history, as shown in FIG. 10B, including the actual search queries and links from the query results that the user had visited. The user can click on the search queries or the links to perform the selected search or visit the document associated with a respective link in the displayed search history, respectively. The user can also search within the search history using a search box.

Figure 11A:
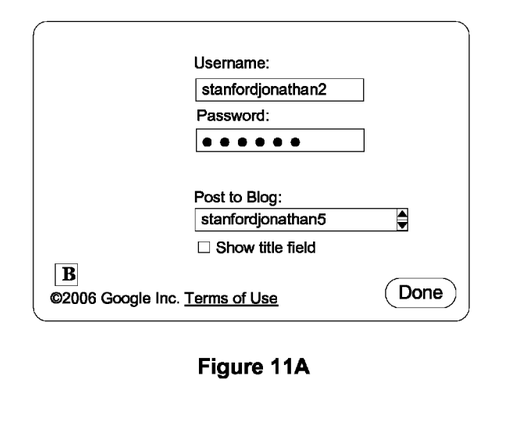
FIG. 11A-11B are schematic diagrams of a user interface of a blog posting application, in accordance with some embodiments.
Figure 11B:
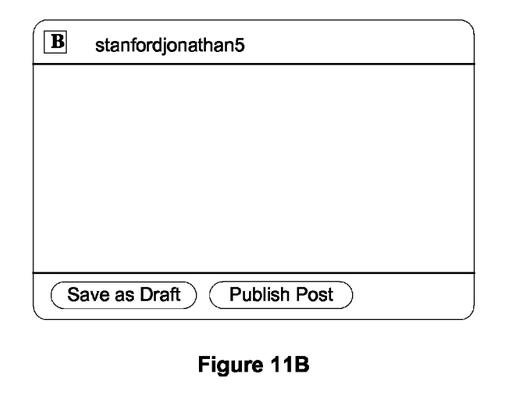

FIG. 11A-11B are examples of a user interface of a blog posting application, in accordance with some embodiments. The blog posting application (e.g., application 742, FIG. 7) posts content supplied by a user to a user selected or use specified blog. The user selected or use specified blog is typically maintained by a content system, such as content system 104 (FIG. 1). FIG. 11A shows the login interface, where the user provides a username and password for logging in. From here, the user may select the weblog to which he wishes to post from a pull down menu of weblogs under his account. After the user logs in, the application displays a post composition box, as shown in FIG. 11B. The user types in the content he wishes to post. The user then can save the post as a draft or submit the content for posting to the selected blog.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   on a search engine having one or more processors and memory storing programs to be executed by the search engine, the search engine remotely located from a client:
   monitoring a plurality of search engine queries received from a user of the client;
   logging the plurality of queries, wherein the logged queries are historical queries submitted by the user to the search engine;
   generating a content feed of logged queries, the content feed including the plurality of logged queries; and
   transmitting the content feed to the client for display in a client application associated with the user.

2. The method of claim 1, further comprising logging links, included in responses to the queries, that are selected by the user; and
   wherein generating the content feed comprises generating the content feed to include the logged queries and the logged links.

3. The method of claim 2, wherein the logged links include a plurality of links selected from a group consisting of links to email messages, links to blog postings and links to web pages.

4. The method of claim 2, wherein the content feed is formatted to display the logged links associated with each respective logged query in a list adjacent to the respective logged query.

5. The method of claim 2, wherein the content feed is formatted to display the logged links and logged queries such that user selection of a logged query in the displayed content feed causes a search corresponding to the logged query and user selection of a logged link causes a document associated with the logged link to be opened in a respective application.

6. The method of claim 2, further comprising logging the date at which each link was selected and wherein the content feed includes the date at which each link was selected.

7. The method of claim 1, wherein a respective logged query of the logged queries includes one or more search operators and one or more search options.

8. The method of claim 1, further comprising disabling logging of queries in response to user selection of a logging option.

9. A computer-implemented method, comprising:
on a client having one or more processors that execute one or more programs stored in memory of the client, the client remotely located from a server:
executing a widget application in response to one or more commands from a user;
receiving from the server a content feed of logged search engine queries, wherein the logged search engine queries are historical queries submitted by the user to a search engine associated with the server; and
displaying, using the widget application, at least a portion of the received content feed.

10. The method of claim 9, wherein the received content feed includes information representing links, included in responses to the search engine queries, that were selected by the user.

11. A search engine, comprising:
one or more processors;
memory; and
one or more programs stored in the memory and executed by the one or more processors, the one or more programs including instructions to:
monitor a plurality of search engine queries received from a user of a client;
log the plurality of queries, wherein the logged queries are historical queries submitted by the user to the search engine;
generate a content feed of logged queries, the content feed including the plurality of logged queries; and
transmit the content feed to the client for display in a client application associated with the user.

12. The search engine of claim 11, the one or more programs further including instructions to log links, included in responses to the queries, that are selected by the user; and
wherein the instructions to generate the content feed include instructions to generate the content feed to include the logged queries and the logged links.

13. A computer readable storage medium storing one or more programs configured to be executed by a computer system, the one or more programs having instructions to:
monitor a plurality of search engine queries received from a user of a client;
log the plurality of queries, wherein the logged queries are historical queries submitted by the user to a search engine;
generate a content feed of logged queries, the content feed including the plurality of logged queries; and
transmit the content feed to the client for display in a client application associated with the user.

14. The computer readable storage medium of claim 13, the one or more programs further including instructions to log links, included in responses to the queries, that are selected by the user; and
wherein the instructions to generate the content feed include instructions to generate the content feed to include the logged queries and the logged links.

15. A client system, comprising:
one or more processors;
a display device;
memory; and
one or more programs stored in the memory and executed by the one or more processors, the one or more programs including instructions to:
execute a widget application in response to one or more commands from a user;
under control of the widget application, receive from a server a content feed of logged search engine queries, wherein the logged search engine queries are historical queries submitted by the user to a search engine associated with the server; and
display on the display device, using the widget application, at least a portion of the received content feed.

16. The client system of claim 15, wherein the received content feed includes information representing links, included in responses to the search engine queries, that were selected by the user.

17. A computer readable storage medium storing one or more programs configured to be executed by a computer system, the one or more programs having instructions to:
execute a widget application in response to one or more commands from a user;
under control of the widget application, receive from a server a content feed of logged search engine queries, wherein the logged search engine queries are historical queries submitted by the user to a search engine associated with the server; and
display, using the widget application, at least a portion of the received content feed.

18. The computer readable storage medium of claim 17, wherein the received content feed includes information representing links, included in responses to the search engine queries, that were selected by the user.

* * * * *